J. L. WOODBRIDGE.
SYSTEM OF ELECTRICAL DISTRIBUTION.
APPLICATION FILED MAY 18, 1908.
941,600.
Patented Nov. 30, 1909.
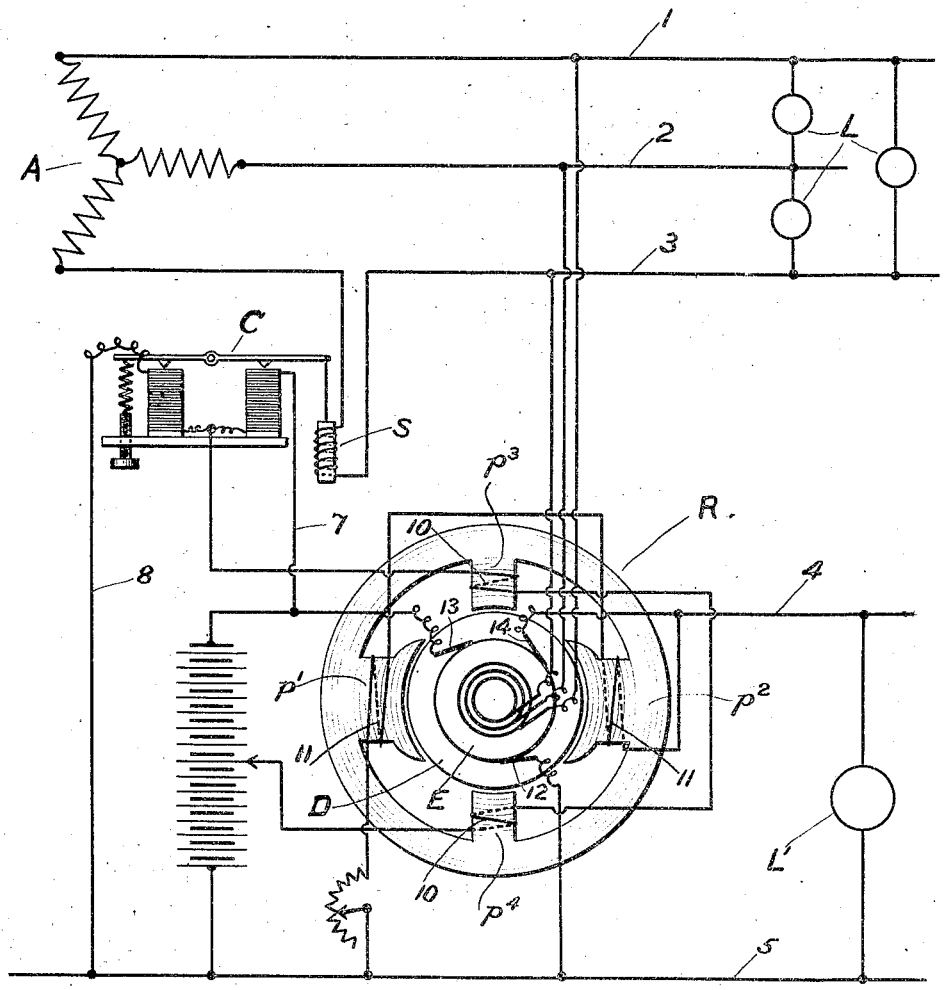
WITNESSES:
INVENTOR
Joseph L. Woodbridge
BY
Augustus B. Stoughton
ATTORNEY

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

941,600.

Specification of Letters Patent.     Patented Nov. 30, 1909.

Application filed May 18, 1908. Serial No. 433,497.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

My invention relates to systems of distribution in which a source of alternating current is supplying alternating current translating devices and also through suitable transforming apparatus direct current translating devices, and it is particularly applicable to systems in which a synchronous converter of the type described in my applications Nos. 411,570 and 416,270 is used in conjunction with a storage battery for controlling the fluctuations of load.

The synchronous converter referred to above is designed to give a variable direct current voltage to cause the battery to charge and discharge, at the same time maintaining a constant alternating current voltage. Such a system is particularly useful where the load consists of alternating current translating devices only and there is no direct current load requiring a constant direct current voltage. If, however, direct current translating devices are also to be supplied requiring a constant direct current voltage some other arrangement must be employed.

One of the objects of my present invention is to provide a synchronous converter designed to develop a constant direct current voltage across one set of brushes for the direct current translating devices and also a variable direct current voltage across another set of brushes which are connected to the regulating storage battery, the alternating current voltage being maintained constant for connection to a constant potential alternating current circuit. This and other objects, as well as the general nature and scope of my invention, will be more clearly understood by reference to the following description in connection with the accompanying drawing, in which—

A is a source of alternating current supplying the alternating current circuit 1, 2, and 3, to which are connected translating devices L.

R is a synchronous converter of the type described in my application 416,270. This converter is provided with two principal poles $P^1$ and $P^2$ and two auxiliary poles $P^3$ and $P^4$, the latter poles being displaced 90° from the former in order to provide for a variable direct current voltage with the least possible change in the alternating current voltage. The principal poles $P^1$ and $P^2$ are excited by a winding 11 connected across the direct current circuit 4—5 thus providing a constant excitation for these poles. The auxiliary poles $P^3$ and $P^4$, are excited by a winding 10, the current in which is controlled by the carbon regulator C, this current varying in amount and direction with the load on the source A. The armature D is connected by suitable collector rings and conductors to the three phase circuit 1, 2, and 3, in the usual manner. It is also provided with a commutator E on which bear three brushes 12, 13 and 14.

The armature winding and commutator connections are so designed that the armature conductors passing under poles $P^2$ and $P^3$ are in series between brushes 12 and 13. Thus the potential between the brushes 12 and 13 is determined by the total flux in the main and auxiliary poles, and will therefore vary with the varying excitation of the auxiliary poles $P^3$ and $P^4$. The storage battery B is connected across these brushes and is therefore caused to charge and discharge by reason of the varying potential. The brush 14 is so located that one of the armature circuits between brushes 12 and 14 includes only those conductors which are passing under poles $P^1$ and $P^2$, and therefore the potential between the brushes 12 and 14 is controlled by the flux in the principal poles $P^1$ and $P^2$ only, that is, brush 14 makes contact with the commutator at a point connected to the armature winding between $P^2$ and $P^3$. Since the excitation of the principal poles is practically constant the potential across the brushes 12 and 14 will therefore be maintained constant irrespective of the excitation of the auxiliary poles. Brushes 12 and 14 are therefore connected to the direct current consumption circuit 4—5 which is supplying the load $L^1$.

The carbon regulator C is a well known device consisting of two piles of carbon disks, the pressure on which is varied by means of a lever controlled by a solenoid S which in this case is connected into the conductor 3 so as to carry the total output from the source A. The two piles of carbon disks are connected in series across the terminals of the battery by means of the conductors 7 and 8. The field winding 10 of the auxiliary poles of the converter is connected between a point in the circuit between the two carbon piles and the middle point of the battery and the current in this winding 10 will vary therefore in amount and direction with slight changes of pressure on the carbon piles produced by slight variations of load on the source A, thus varying the direct current voltage between the brushes 12 and 13, thereby causing the battery to charge and discharge in response to the small fluctuations of load on the source A. This effect will be produced whether the fluctuations of load originate on the alternating current circuit as at L or on the direct current circuit as at L¹. The converter R as thus designed therefore provides means for maintaining a constant voltage on the direct current consumption circuit and at the same time produces a variable voltage across the battery to compel it to charge and discharge in response to fluctuations of load on either circuit.

It will be understood that modifications may be made in the details without departing from the spirit of the invention, and I do not therefore limit myself except as the prior art may require, but

Having thus described my invention what I claim is:

1. In combination an armature provided with alternating current terminals and a commutator, a field frame for the armature provided with principal and auxiliary poles, means for applying a constant excitation to the principal poles, means for applying a variable excitation to the auxiliary poles, and brushes bearing on the commutator whereof some make contact at points whose potential difference is determined by the flux in the principal poles, while others make contact at points whose potential difference is determined by the total flux in both the principal and the auxiliary poles.

2. An alternating current circuit and its source, a direct current circuit, a storage battery, an armature operatively connected to the alternating current circuit, a field frame for the armature provided with principal and auxiliary poles, means for applying a constant excitation to the principal poles, means responsive to the electrical condition of the alternating current circuit for applying a variable excitation to the auxiliary poles, brushes bearing on the commutator, whereof some make contact at points whose potential difference is determined by the flux in the principal poles and are connected to the direct current circuit, while others make contact at points whose potential difference is determined by the total flux in both the principal and the auxiliary poles and are connected to the storage battery.

In testimony whereof I have hereunto signed my name.

JOSEPH LESTER WOODBRIDGE.

Witnesses:
W. J. JACKSON,
FRANK E. FRENCH.